United States Patent [19]

Tarolli et al.

[11] Patent Number: 5,724,561
[45] Date of Patent: Mar. 3, 1998

[54] SYSTEM AND METHOD FOR EFFICIENTLY DETERMINING A FOG BLEND VALUE IN PROCESSING GRAPHICAL IMAGES

[75] Inventors: Gary Tarolli, Concord, Mass.; Scott Sellers, Menlo Park, Calif.

[73] Assignee: 3Dfx Interactive, Incorporated, Mountain View, Calif.

[21] Appl. No.: 552,746

[22] Filed: Nov. 3, 1995

[51] Int. Cl.$^6$ .................... G06F 15/00; G06F 13/00
[52] U.S. Cl. .................... 395/523; 395/501; 395/119
[58] Field of Search ........................ 395/122, 162, 395/164, 166, 126, 120, 121, 119, 501, 505, 506, 511, 513, 514, 523; 345/113

[56] References Cited

U.S. PATENT DOCUMENTS

| | | | |
|---|---|---|---|
| 4,835,712 | 5/1989 | Drebin et al. | 395/123 |
| 5,123,085 | 6/1992 | Wells et al. | 395/121 |
| 5,267,183 | 11/1993 | Guilfoyle et al. | 364/713 |
| 5,327,520 | 7/1994 | Chen | 395/2.28 |
| 5,339,386 | 8/1994 | Sodenburg et al. | 395/122 |
| 5,444,835 | 8/1995 | Turkowski | 395/135 |
| 5,486,844 | 1/1996 | Randall et al. | 345/113 |
| 5,490,238 | 2/1996 | Watkins | 395/122 |
| 5,515,484 | 5/1996 | Sfarti et al. | 395/124 |
| 5,528,741 | 6/1996 | Lucas | 395/131 |

*Primary Examiner*—Raymond J. Bayerl
*Assistant Examiner*—Cao H. Nguyen
*Attorney, Agent, or Firm*—Fenwick & West LLP

[57] ABSTRACT

A system for generating blend values for three-dimensional graphic rendering includes a first register, a second register, third register, an index creation unit, a blend value generation unit and a blending unit. The first register receives and stores color pixel data, and the second register receives and stores a depth perspective component; and the third register receives and stores fog color data. The output of the second register is coupled to the index creation unit which uses the received depth perspective component to generate a two-part index. The two-part index is output by the index creation unit to produce a blend value. The first portion of the index is used to address a table in the blend generation unit, and the second portion of the index is used to produce an increment value added to output of the table resulting in the creation of a blend value. The blend value, the color pixel data and the fog color data are then blended by the blending unit and output by the system. The invention also includes a method for generating a blend value and producing a blended color output. The method includes the steps of: producing an index having a first portion and a second portion from a distance value; determining a base value using the first portion of the index, determining a delta between the base value and the next entry in the table using the first portion of the index, determining a blend increment using the delta and the second portion of the index; and producing a blend value by adding the base value to the blend increment; and blending the blend value with input pixel data.

12 Claims, 8 Drawing Sheets

SYSTEM AND METHOD FOR EFFICIENTLY DETERMINING A FOG BLEND VALUE IN PROCESSING GRAPHICAL IMAGES

BACKGROUND OF THE INVENTION

1. Field of the Invention

The present invention relates generally to computer graphics and systems for producing graphical images on a display device. In particular, the present invention relates to a system and method for generating three-dimensional graphic images. Still more particularly, the present invention is directed to a method for producing a blend value and blending the produced value with data forming an image.

2. Description of the Background Art

The use of computers for producing graphical images is well known. The images produces by computers have generally be limited to two-dimensional images because of the amount of processing necessary to generate three-dimensional images. However, recent increases in processor capability in conjunction with other increases in speed and size of memory as well as other peripherals, has made the processing of three dimensional graphics possible. Nonetheless, existing graphics system continue to suffer shortcomings in processing speed and image quality especially for three-dimensional graphic images.

Graphic images whether for display on a computer screen or video monitor or printing by a printer are generated by processing an array of picture elements (pixels). The number of computations required to process an image can be billions or trillions because of number of factors. First, generally the graphic images are produced in color, especially three-dimensional images. With color, each pixel is defined by a plurality of colors or channels such as RGB or CYN. Thus, the number of computations are increased significantly for each additional channel that is added. Second, the quality of the images has increased, and such increases in quality are typically achieved by increasing the number and density of pixels. Increasing the number of pixel has a direct correlation to the number of computation required to process an image. Third, a plurality of characteristics such as blending, scaling, color or shading must be applied either once or more than once, especially for rendering three-dimensional images. For example, in rendering a pixel there are often multiple blending operations such as texture blending, color combine/modulation blending, fog blending and alpha blending that are all performed on a single pixel. These characteristics are typically computationally expensive because multiplication and division operations are plentiful and these types of operations require much more resources that additive operations.

A particular problem associated with prior art graphic systems is the blending operation. Not only the operation of blending itself, but also the generation of certain blend values is very computationally expensive. For example, the generation of fog blend values for producing fog is very expensive. The generation of certain blend values is computationally expensive because it often involves numerous multiplication operations need for calculating exponential values. Because of computational limitations, the prior art is unable to provide a system that operates in real-time and is able to calculate the high quality blend values without complex and expensive hardware.

One prior art approach attempting to solve the blend value calculation problem has been to store exemplary blend values in a look-up table. Then when a blend value is needed, the look-up table is accessed which is faster than real-time calculation of the blend value. However, this approach has not been successful for a number of reasons. First, the number of possible blend values needed to adequately render an image is very large. For example, consider using the blend operation to add fog or haze to an image. Dense or Thin fog cannot be adequately rendered without a very large fog table, and even then with poor results. The result of not using a large enough table is visible fog bands. Second, there is not an effective way to index the look-up table. Most systems utilize a depth or distance value, common in the rendering of three-dimensional graphical images, to index look-up tables for blend values. Utilizing a straight distance value or its reciprocal results in too many fog table entries devoted to small values of the distance, or too many fog table entries devoted to large values of the distance. Third, whenever the entries in neighboring table entries vary by a small amount, the different amounts of blending creates visible artifacts and can be visually displeasing. Because of the prior art spacing between the table entries, visual artifacts are unavoidable.

Thus, there is a continuing need for a system and method that is capable of producing blend values and blending them with the pixel data forming three-dimensional graphic images.

SUMMARY OF THE INVENTION

The present invention overcomes the deficiencies and limitations of the prior art with a novel system and method for generating blend values and blending them with image data for three-dimensional graphic rendering. The system of the present invention advantageously provides a table for storing blend values where the table is indexed using a concatenated value of an exponent of a distance value and significant portions of the mantissa for the distance value. In addition to the table values, additional blend values are created by interpolating between adjacent entries in the table. The indexing scheme of the present invention advantageously reduces the size of the look-up table while simultaneously significantly increasing the visual quality of the images produced using blend values generated by the system.

The system comprises a first register, a second register, an index creation unit, a blend value generation unit and a blending unit. Color pixel data is input to the system and stored in the first register. A distance value, w, is provided to the system and stored in the second register. The output of the second register is coupled and input to the index creation unit. The index creation unit receives the distance value, and in turn produces an index. The index preferably has a floating point format, and includes a first portion and a second portion. The first portion is preferably the exponent and selected bits of the mantissa of a floating point number, and is used as an index to address a table in the blend generation unit. The second portion preferably is a selected portion of the mantissa of the floating point number, and is used to produce an increment value added to output of the table. This unique indexing scheme of the present invention is particularly advantageous because is allows creation of a number of blend values from a small table and provides spacing between entries in the fable that eliminates the visual artifacts and other shortcomings of the prior art. The index creation unit outputs the two portion index created from a distance value to the blend value generation unit. The blend value generation unit preferably includes a table, a multiplier and an adder for producing a blend value by adding a base blend value and an increment value derived from the index. The output of the blend value generation unit is input to the blending unit along with the output of the first register. The blending unit provides the blend color output signal.

The present invention includes a method for generating a blend value and producing a blended color output. The method includes the steps of: producing an index having a first portion and a second portion from a distance value; determining a base value using the first portion of the index, determining a delta between the base value and the next entry in the table using the first portion of the index, determining a blend increment using the delta and the second portion of the index; and producing a blend value by adding the base value to the blend increment; and blending the blend value with input pixel data.

DETAILED DESCRIPTION OF THE PREFERRED EMBODIMENTS

While a system 10 constructed according to the present invention will now be described in the context of generating a blend value for producing the effect of fog or haze on a three-dimensional image, those skilled in the art will realize that the invention is applicable to the generation of any type of blend values including but not limited to the generation of blend values for shading, shadows and other lighting effects, and foreign matter accumulation on surfaces. The present invention is best suited for instances where the blend value has an exponential function, and the invention uses the exponential function and piecewise linear approximation to efficiently generate high quality blend values.

Fog in three dimensional graphics refers to a process whereby the color of a pixel is modified by a fogging equation prior to rendering into a frame buffer. This fogging equation modifies the color of the pixel such that color of the pixel becomes more and more like the color of the fog as distance from the eye increases. A typically fog equation blends between the pixel color and the fog color, which is often a constant, wherein the amount of the blend is a function of distance from the viewer's eye. There are numerous functions that are typically used to those skilled in the art. Typical equations for fog blending and the fog blend factor, respectively, include:

$$ColorOut = ColorIn * (1 - FogBlendFactor) + FogColor * FogBlendFactor$$

$$FogBlendFactor = 1 - e^{-kz}$$

where k represents the fog density and z represents distance from the viewer's eye. A different equation for computing the fog blending factor squares the z term in the previous equation. The different equations result in different visual appearances for the fog.

The uses of fog are two-fold. One use is to approximate the atmospheric effects of fog and haze on the viewing of objects in a scene. In this application, the fog color is set to the color of the maximum density fog bank, and the scalar coefficient k is used to control the density of the fog. Another not so obvious use of fog is to approximate the effects of a light in a dark scene where the light is located at the same location as the viewer. In this case, the fog color is set to black, so objects become darker as they get further from the viewer and hence further from the light, and eventually fade completely to black. In scenes with ambient light, the fog color is set to the color of the ambient light in the scene, perhaps a very dark shade of grey.

Figure 1:
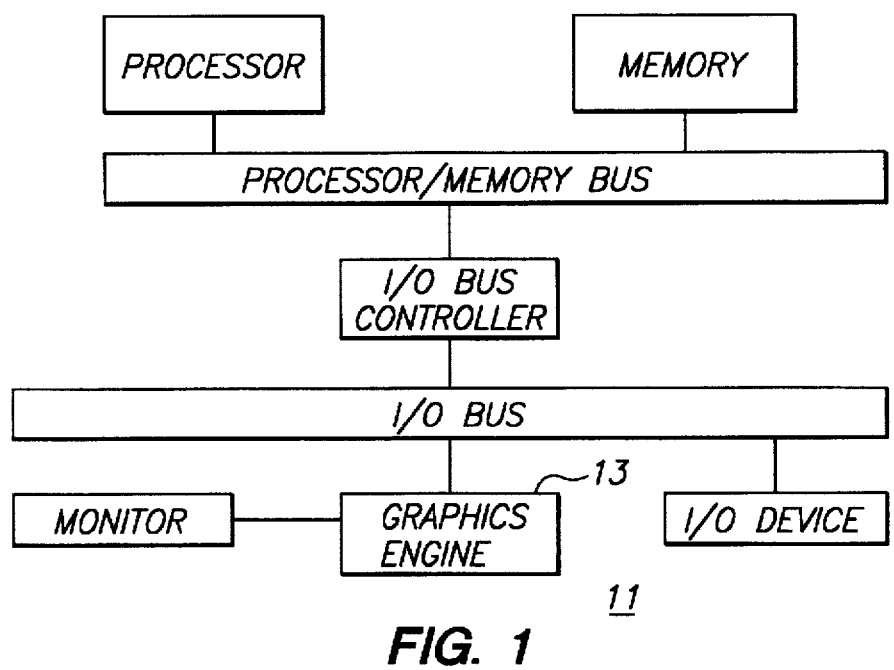
FIG. 1 is a block diagram of a computer system including a graphics engine.

Referring now to FIG. 1, a computer system 11 of which the present invention forms a part is shown. In particular, the present invention forms a portion of a graphics engine 13.

Figure 2:
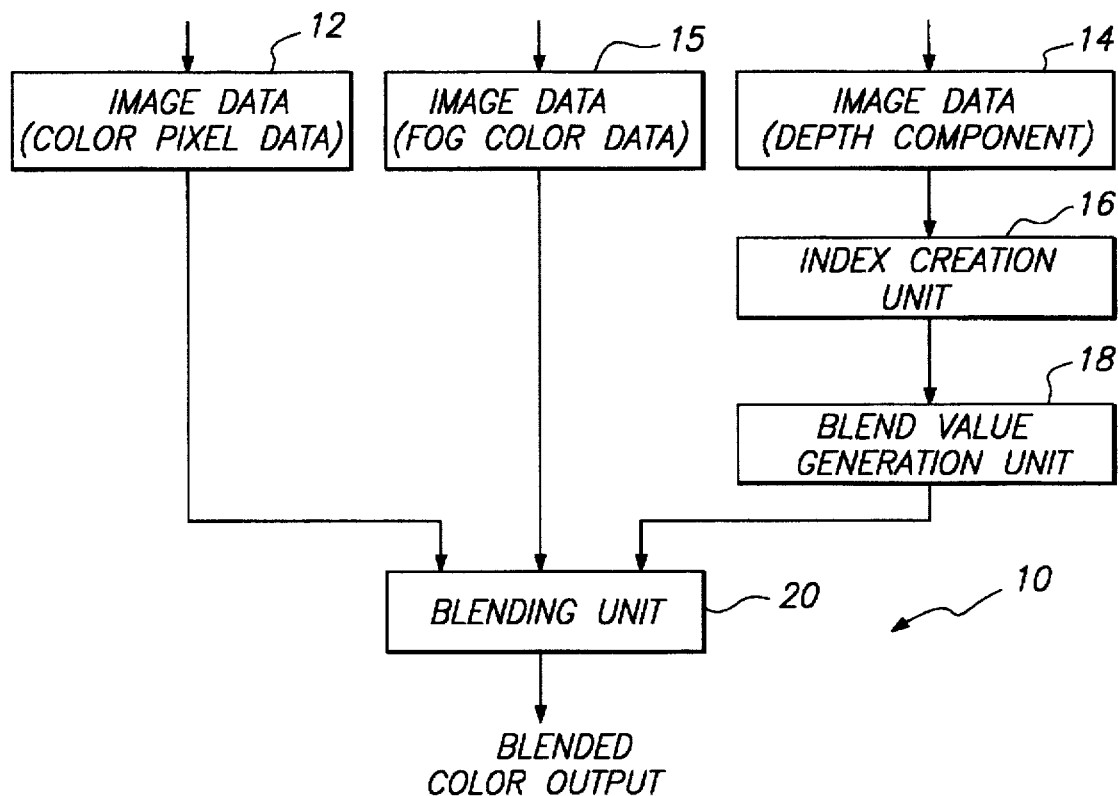
FIG. 2 is a block diagram of a preferred embodiment for a system constructed according to the present invention.

Referring now to FIG. 2 a block diagram of the system 10 constructed according to the present invention is shown. The system 10 preferably comprises a first register 12, a second register 14, a third register 15 an index creation unit 16, a blend value generation unit 18, and a blending unit 20. The system 10 preferably receives three inputs: 1) image data including data for the rendering of colored pixel (color pixel data); 2) image data including data for the color of fog or the other color being blended (fog color data) and 3) image data including a distance metric for a perspective depth component of an image (depth component). These values are received from other conventional portions of the graphics engine 13 and are stored in the first, third and second register 12, 15, 14, respectively. These values are preferably derived by iteration over a triangle using a reciprocal of the perspective depth component, 1/w, DWDX and DWDY, which provide the gradients of 1/w in the X and Y directions on the screen. The iteration is done by other portions of the graphics engine 13, and then the color pixel data and depth component are provided to the system 10. While the present invention is described as including the first and second register 12, 14 for storing the color pixel data and depth component for use by the system 10, those skilled in the art will realize that the color pixel data and depth component could be respectively provided directly to the blending unit 20 and the index creation unit 16.

The index creation unit 16 and the blend value generation unit 18 are able to provide a very good approximation of the above-identified equation for producing a fog blend value as well as other equations. The index creation unit 16 preferably receives the depth component and produces a novel two-portion index that is in a floating point format, as will be described in more detail below with reference to FIG. 3. The first portion of the index is an index value and preferably includes an exponent of depth component and significant bits of the mantissa for the depth component. The second portion of the index is an interpolation value and includes the mantissa for the depth component. The index creation unit 16 outputs this two-portion index to the blend value generation unit 18. The blend value generation unit 18 is includes a look-up table and other logic, as will be described in more detail with reference to FIGS. 4–8. The blend value generation unit 18 stores several entries for fog blend values. The first portion of the index is used to determine the appropriate entry to used as the blend value. Further, the second portion of the index is used to interpolate between successive entries in the table and greatly increases the number of blend values that can be generated. The blend value generation unit 18 outputs the blend value and is coupled to an input of the blending unit 20.

The blending unit 20 has a first input that is coupled to the output of the first register 12 to receive color pixel data and a second input that is coupled to the output of the third register 15 to receive a fog color, and a third input to the output of blend value generation unit 18 to receive the blend value. The blending unit 20 is preferably a processor such as a texture compositing unit as described in "Texture Compositing Apparatus and Method," U.S. patent application Ser. No. 08/552,740, filed Nov. 3, 1995 which is incorporated by reference. Those skilled in the art will also realize that the blending unit 20 may be an ASIC or other dedicated hardware embodiment capable of computing a blended color output which is equal to: ColorIn * (1−FogBlendFactor)+ FogColor * FogBlendFactor, where the ColorIn data is the output of the first register 12, the FogColor is the output of the third register 15 and the FogBlendFactor data is the output of the blend value generation unit 18.

Specific embodiments for the index creation unit 16 and the blend value generation unit 18 will now be described with reference to particular widths for data paths and bit sizes for indexes and other values. It should be noted that such values are provided only by way of example as the best mode of the present invention. Those skilled in the art will realized that the sizes of data paths and number of bits used may be modified without departing from the true spirit or scope of the present invention.

Figure 3:
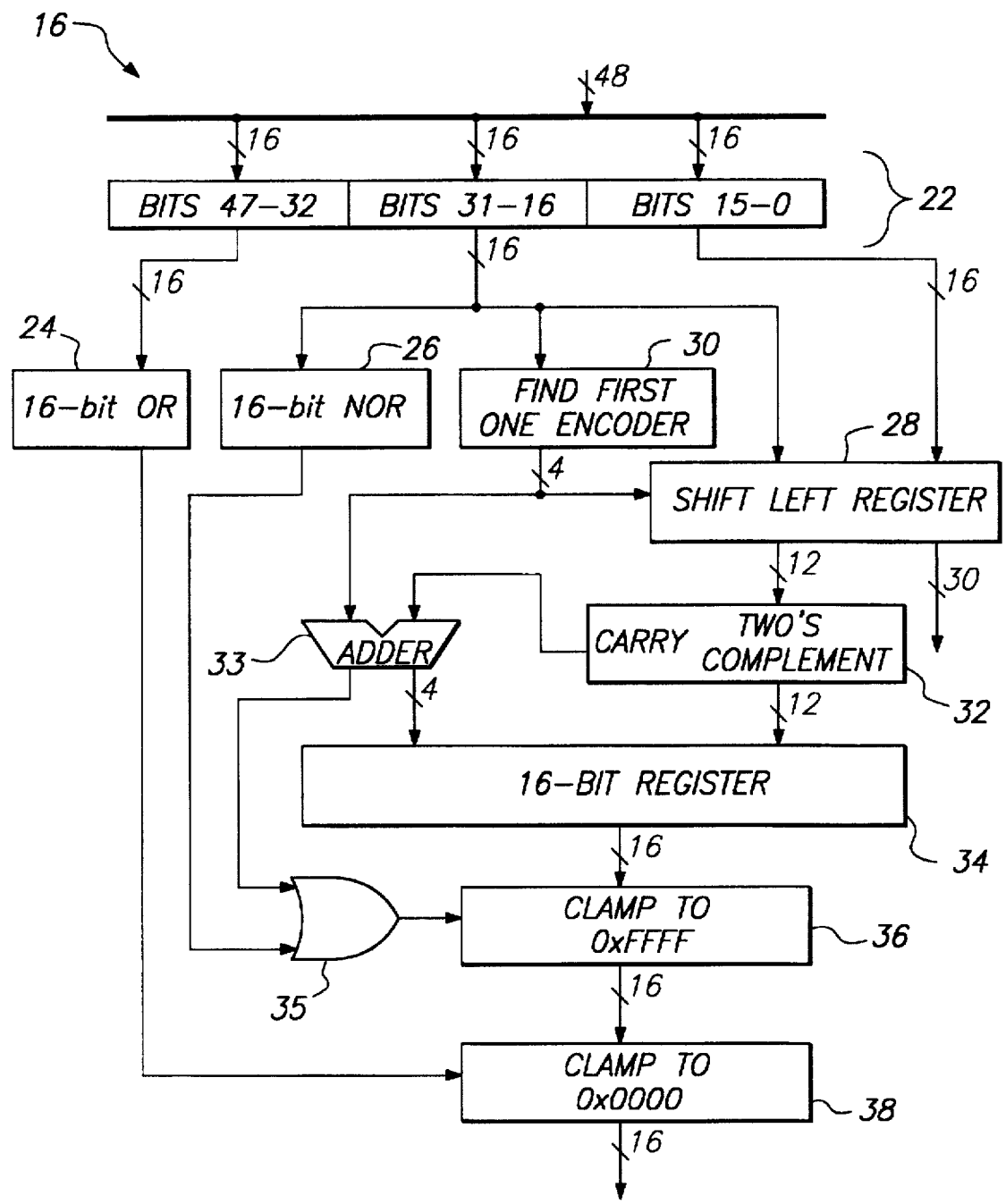
FIG. 3 is a block diagram of a preferred embodiment of the index creation unit of the present invention.

Referring now to FIG. 3, a preferred embodiment for the index creation unit 16 is shown. The present invention preferably receives a depth component from the second register 14. The depth component preferably is a 48-bit value in a fixed point unsigned 16.32 format. In other words, the most significant 16 bits are an integer value and the remaining 32 bits are a fractional value. Those skilled in the art will realize that more or less than 48 bits may be used for the depth component, and other formats may be used such a n.m, where n is the number of integer bits and m is the number of fractional bits. The 48 bits are received and stored in a register 22. This register 22 is needed where the second register 14 is eliminated, but is unnecessary where the system 10 includes register 14. This register 22 is provided primarily for purpose of explanation to illustrate how the 48 bits are used.

The index creation unit 16 preferably comprises an OR unit 24, a NOR unit 26, a shift register 28, an encoder 30, a two's complement unit 32, a register 34, a first clamp 36 and a second clamp 38. The operation of the index creation unit 16 generally is a follows. The shift register 28, encoder 30, and two's complement unit 32 receive the 32 least significant bits (or the fractional portion of the input value) and generate a floating point value, preferably 16 bits, that is provided to the register 34. An output of the register 34 is coupled to an input of the first clamp 36 and then an output of the first clamp 36 is coupled to an input of the second clamp 38. The output of the second clamp provides of the output of the index creation unit 16 and provides a two-portion index.

Lines from register 22 providing the 16 most significant bits (bits 47–32 or the integer portion of the depth values) are preferably coupled to inputs of the OR unit 24. The OR unit 24 may be a series of cascaded OR-gates or other combinational logic such that a zero is output if all the 16 bits input are zeros, otherwise the OR unit 24 outputs a one if any of the 16 bits input is a one. The OR unit 24 generates a control signal at its output for clamping out of range values to generate an index of all zeros (0x0000). If any of the 16 integer bits of the depth component are non-zero then the value is clamped to all zeros (0x0000). Any negative value for the depth component will have the MSB of the 16 integer bits set to one and implies a negative depth component value and therefore we clamp to the output to zero. Any other value that has at least one bit set to one in the 16 integer bits represents a 1/w value greater or equal to 1.0, therefore we again clamp the output to zero.

The output of the OR unit 24 is coupled to a control input of the second clamp 38. The second clamp 38 has a data input, a control input and a data output, and either outputs all zeros if the control signal on the control input is one or passes through the value received at the data input if the control signal on the control input is zero. Such a second clamp 38 could be made of a plurality of two-to-one multipexlers with a common control line, one input of each multiplexer coupled to zero and the other input of each multiplexer coupled to a respective output of the first clamp 36. Thus, if there is even a single one in the integer portion of the depth component, the output of the index creation unit 16 is set to zero.

The output lines from register 22 providing the 16 most significant bits of the fractional portion (bits 31–16) are preferably coupled to inputs of the NOR unit 26. The NOR unit 26, like the OR unit 24, may be a series of cascaded OR-gates with the output of the last OR-gate inverted or other combinational logic such that a one is output if all the 16 bits input are zeros, otherwise a zero is output if any of the 16 bits input is a one. The NOR unit 26 generates a control signal at its output for clamping out-of-range values to generate an index of all ones (0xFFFF). If all of the 16 most significant bits of the fractional portion are zero, then the blend value is clamped to all ones (0xFFFF). Any depth component with 16 or more zeroes to the right of the binary point represents a value smaller than the smallest value represented in the table in the blend value generator 18 and therefore is clamped to the highest possible index & interpolation value which is all ones (0xFFFF). The output of the NOR unit 26 is coupled through an OR-gate 35 to a control input of the first clamp 36. The first clamp 36 is similar to the second clamp 38 except that it either passes data received at its input or outputs all ones if the control signal on the control input is zero or one, respectively. Thus, if all the bit 31–16 are zero, the first clamp 36 disregards the value input form the register 34 and outputs all ones to the second clamp 38.

The find first one encoder 30 also has inputs coupled to receive the 16 most significant bits of the fractional portion (bits 31–16). The find first encoder 30 is preferably a priority encoder or may also be made of a counter and combinational logic. The find first one encoder 30 receives 16 bits and outputs a four-bit representation for the position of the most significant leading one. In other words, the find first encoder 30 effectively counts the number of zeros beginning with the leftmost bit (bit 31) until a one is reached. For example, if the input were "0001000011001100" the find first encoder 30 would output 0011, or if "0000011010110011" the find first encoder 30 would output 0101. By counting zeroes to the right of the binary point we are actually computing the exponent of 1/(1/w) or w. Another way of looking at this calculation is that by counting zeroes to the right of the binary point we are computing the absolute value of exponent of 1/w; the actual exponent is negative. Since the exponent of w is minus the exponent of 1/w we are actually computing the exponent of w when we are counting zeroes to the right of the binary point. The output of the find first one encoder 30 is preferably coupled through an adder 33 to the four most significant bits of the 16-bit register 34. The find first one encoder 30 is also coupled to the shift register 28 to indicate the number of bits the value stored in the shift register is to be left shifted.

The shift register 28 is also coupled to receive the most significant bits of the fractional portion (bits 31–16) as well as the remaining bits of the fractional portion (bits 15–0) as data. The shift register 28 has control inputs that are coupled to receive the output of the find first one encoder 30. In response the control signal received from the find first one encoder 30, the shift register 28, shifts the value stored in the shift register 28 to the left by the number of bits specified by the control signal plus one. Thus, the present invention shifts off the leading zeros and the first one off the left edge, thereby removing the hidden one from the mantissa. For example, if the find first one encoder 30, outputs a "0011," the value in the shift register 28 is shifted four bits to the left. Similarly, if the find first one encoder 30 outputs a "1000," the value in the shift register 28 is shifted nine bits to the left. The shifting of bits basically shifts the leading zeros out of the shift register 28 and these leading zeros are discarded. The most significant 12 outputs of the shift register 28 are coupled to respective data inputs of the two's complement unit 32. The 30 least significant bits are unused and simply ignored. The two's complement unit 32 preferably has a plurality of inputs and a plurality of outputs. The plurality of outputs are coupled to the 12 least significant bit inputs of the 16-bit register 34. The two's complement unit 32 preferably performs an inversion of the bits and adds one to the inverted value. The two's complement unit 32 also provides a carry-out output that is preferably added to the bits from the find first one encoder 30. The outputs of the find first one encoder 30 are coupled to a first set of inputs for adder 33 and the carry-out output of the two's complement unit 32 is coupled to the second input of the adder 33. The most significant bit of the adder 33 is preferably coupled through OR-gate 35 to the first clamp 36. Thus, if the bits from the find first one encoder 30 are "1111" and the two's complement unit 32 has a carry-out of one the entire output of the index generation unit is clamped to FFFF. The operations described above for the shift register 28 and the two's complement unit 32 advantageously compute a 12-bit mantissa for the fractional value received. The above approach yields an approximation of the true mantissa. More importantly, the present invention produces a different mantissa value for each unique value of the 12 bits used in computing the mantissa. To compute unique 12-bit mantissa values using a true and exact mantissa calculation requires more than 12 input bits and more complex logic. One of the benefits of this method is the simplicity of the hardware implementation. Thus, the value stored in the register 34 is a floating point representation of the fractional portion of the depth component. This floating point representation is used as the actual index and interpolation value by the blend value generation unit 18, unless the first or second clamps 36, 38 is activate as has been discussed above with regard to out-of-range values.

Figure 4A:
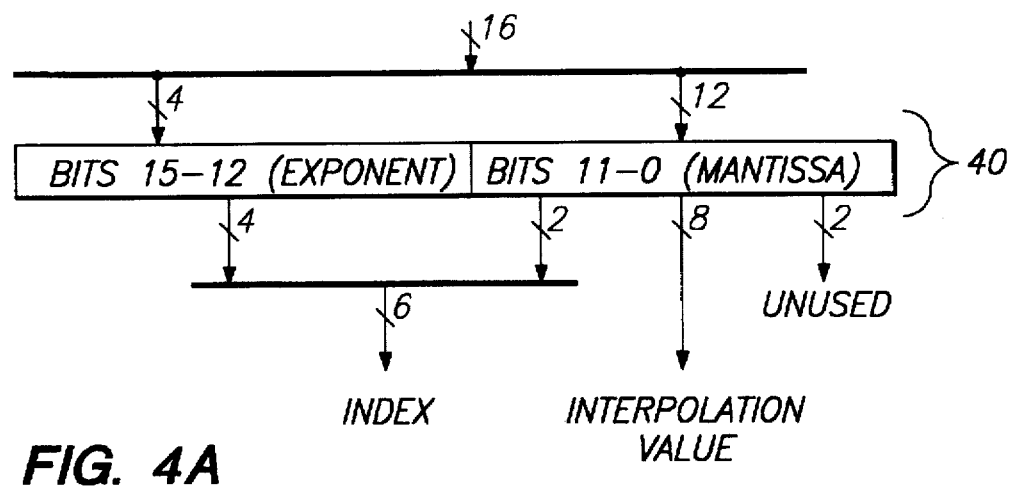
FIG. 4A is a graphical representation of a first embodiment for the blend index according to the present invention.
Figure 4B:
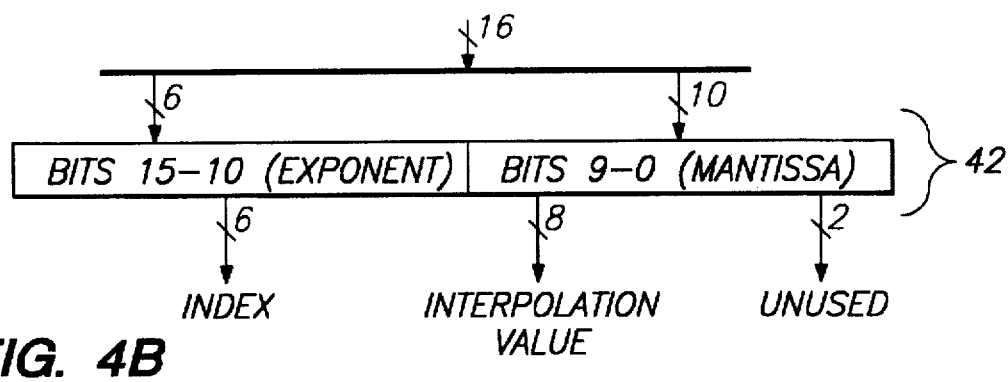
FIG. 4B is a graphical representation of a second embodiment for the blend index according to the present invention.

Referring now to FIGS. 4A and 4B, the use of the floating point representation output by the index generation unit 16 will be described in more detail. FIG. 4A shows of a preferred embodiment for use of the output from the index generation unit 16. The index generation unit 16 preferably provides an output having 16 bits. The four most significant bits (bits 15–12) are the exponent of a floating point number and the remaining 12 bits are a mantissa of the floating point number as shown in block 40. An index is generated from the floating point number using the exponent and the two most significant bits of the mantissa, essentially the index is a 6 bit number formed of bits 15–10. This index is used to determine the entry in the table. This advantageously allows the present invention to limit the table size to $2^6$ or 64 entries. In the preferred embodiment, the interpolation value is generated from the floating point number using the next eight bits (bits 9–2) less in significance following the bits used for the index. These bits are all part of the mantissa. The remaining two bits of the mantissa are unused by the indexing scheme of the present invention. Use of the additional eight bits as an interpolation value allows $2^8$ values for each entry in the table, making the tables' effective size $2^{14}$ or 16K.

Referring now to FIG. 4B, an alternate embodiment for generating the index and interpolation values is shown. In the alternate embodiment, the index generation unit 16 generates a floating point number. The six most significant bits (bits 15–10) of the floating point number are the exponent and the remaining ten bits (bits 9–0) are the mantissa as shown in block 42. In such an alternate embodiment, the six bits of exponent are used as the index, the eight most significant bits of the mantissa are used as the interpolation value, and the two remaining bits are unused. The alternate embodiment demonstrates how the indexing scheme of the present invention can be used regardless of the number of bits used for the exponent or the mantissa or the bit size of the number output by the index generation unit 16, so long as the index includes all the bits of the exponent.

Figure 5:
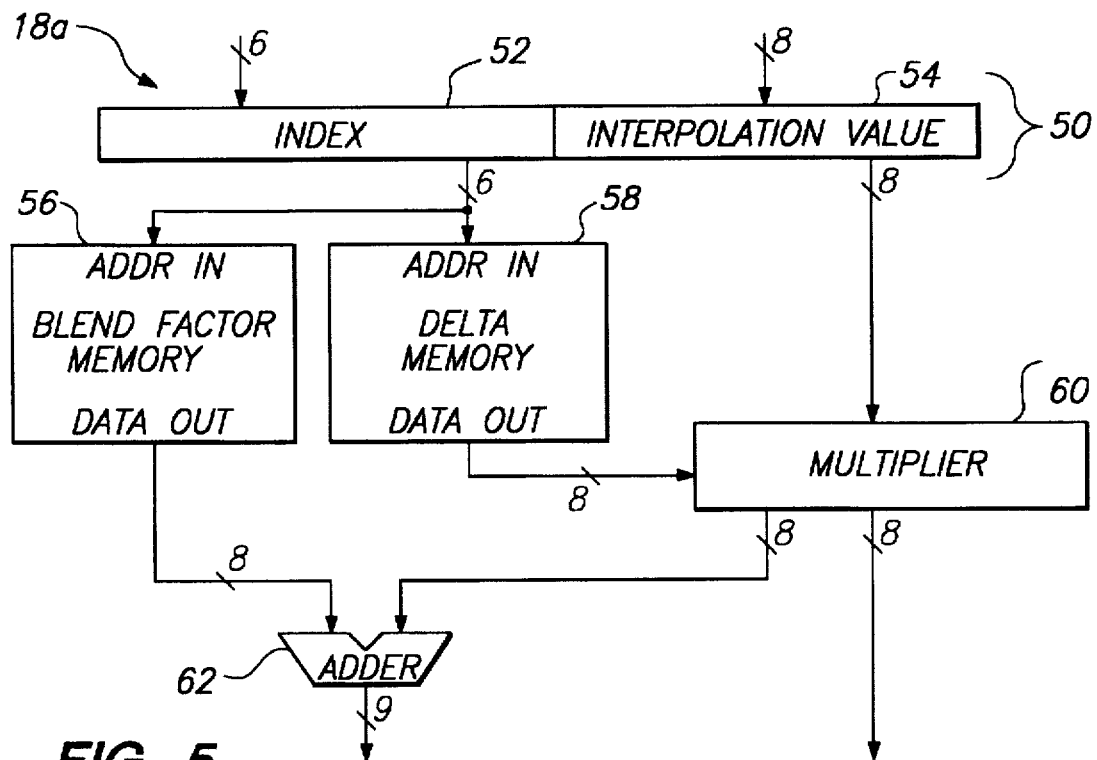
FIG. 5 is block diagram of a first and preferred embodiment for a blend value generation unit of the present invention.

Referring now to FIG. 5, a first and preferred embodiment of the blend value generation unit 18a is shown. The first embodiment of the blend value generation unit 18a includes: a register 50 having an upper portion 52 for storing the index and a lower portion 54 for storing the interpolation value; a blend factor memory 56; a delta, δ, memory 58; a multiplier 60; and an adder 62. The blend value generation unit 18a is basically a look-up table and additional logic for calculating an increment value. The look up table preferably had 64 entries and each entry in the table consists of a base value and the difference or delta between the next table entry and the current table entry. The index is used to locate a table entry, and the interpolation value is used to interpolate between table entries using the difference value within the table entry. The first embodiment of the blend value generation unit 18a generates the blend value by adding the base value and to the product of the delta and the interpolation value (blend value=table entry+interpolation value * δ).

The register 50 has inputs that are coupled to the index generation unit 16 such that the index is received and stored in the upper portion 52 of the register 50 and the interpolation value is received and stored in the lower portion 54 of the register 50. The outputs of the upper portion 52 of the register 50 are coupled to the address inputs of the blend factor memory 56 and the delta memory 58. The blend factor memory 56 and the delta memory 58 collectively form a table with each entry having a base value provided by the blend factor memory 56 and a δ value provided by the delta memory 58. The delta memory stores a value for each entry that indicate the difference in value between the current entry in the table and a next entry in the table. An exemplary table of base values for generating a fog blending value are provided in Appendix A. The table represents a piece-wise linear approximation of the true curve for the fog blending factor. The data output of the blend factor memory 56 is coupled to a first input of the adder 62 so that the base value can be summed with an increment value. The increment value is created by multiplying the δ value to the interpolation value. The interpolation value is provided at the outputs of the lower portion 54 of the register and is coupled to a first plurality of inputs of multiplier 60. The data outputs of the delta memory 58 are coupled to a second plurality of inputs of multiplier 60. The multiplier preferably performs and 8-bit by 8-bit unsigned multiplication function. The outputs of multiplier 60 are coupled to a second input of the adder 62. In the preferred embodiment, only the eight most significant bits output by the multiplier are used as the increment value and coupled to the adder 62. The output of the adder provides the blend value generated by the present invention.

Figure 6:
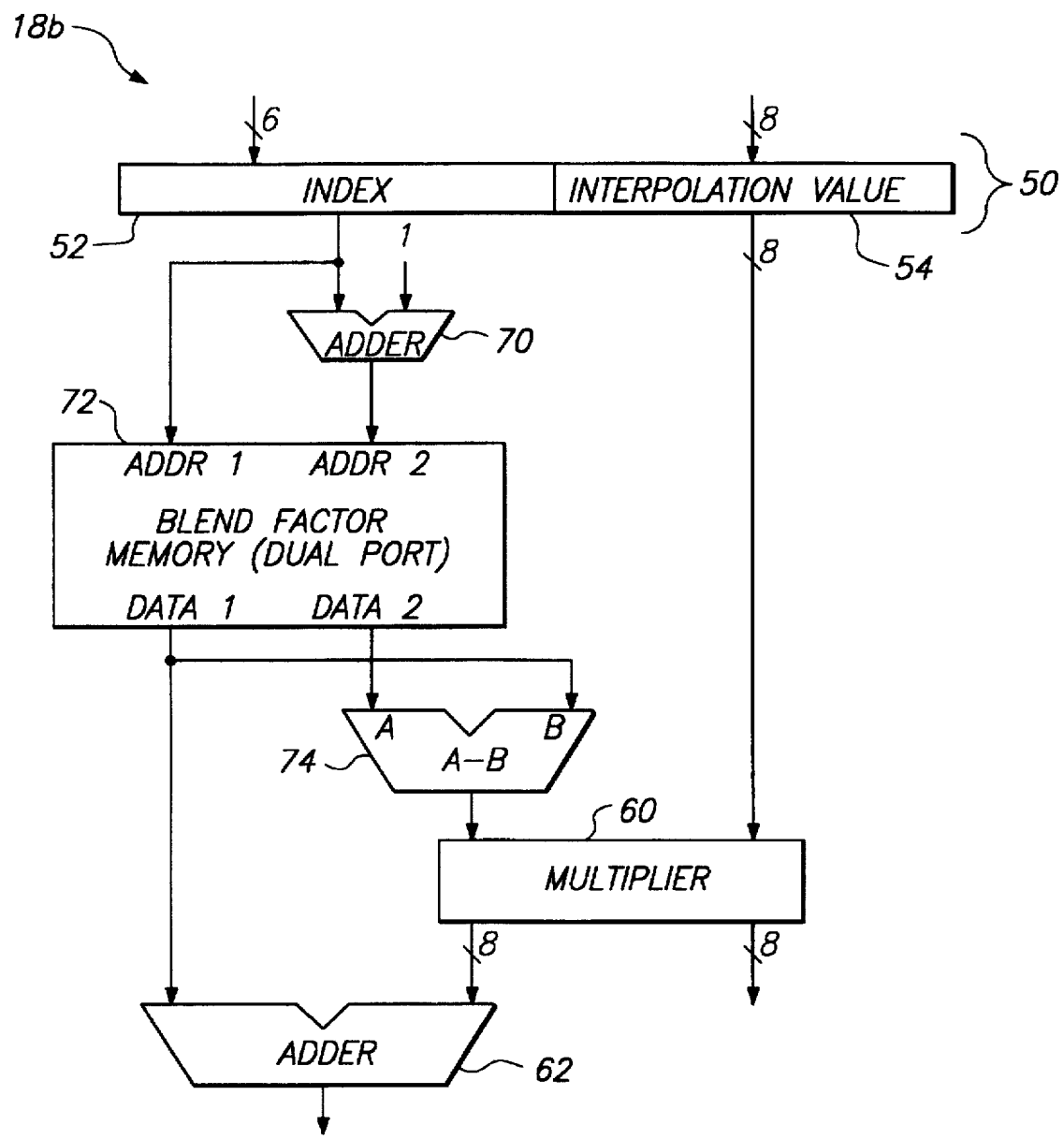
FIG. 6 is block diagram of a second embodiment for the blend value generation unit constructed according to the present invention.
Figure 7:
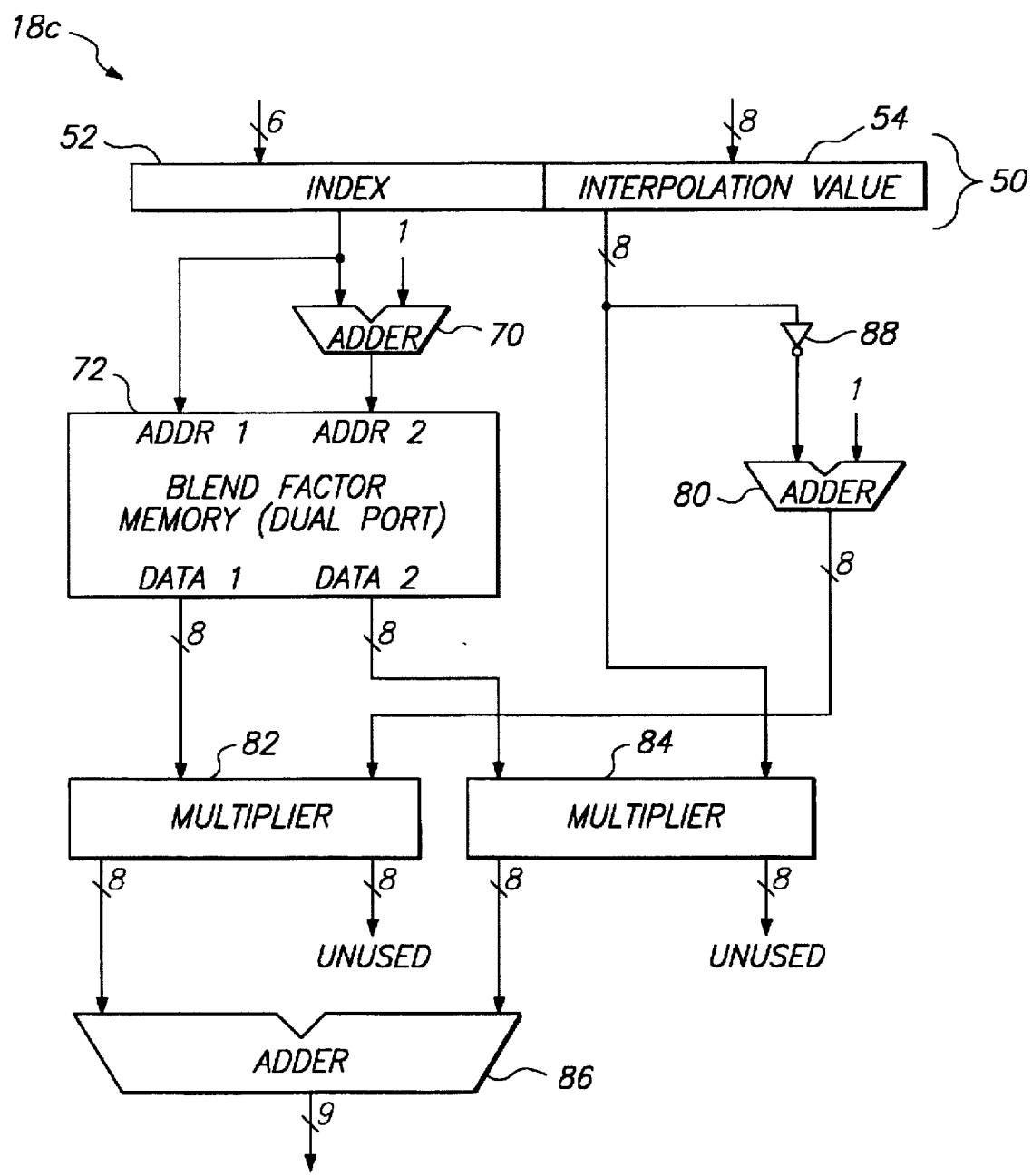
FIG. 7 is block diagram of a third embodiment for the blend value generation unit of the present invention.
Figure 8:
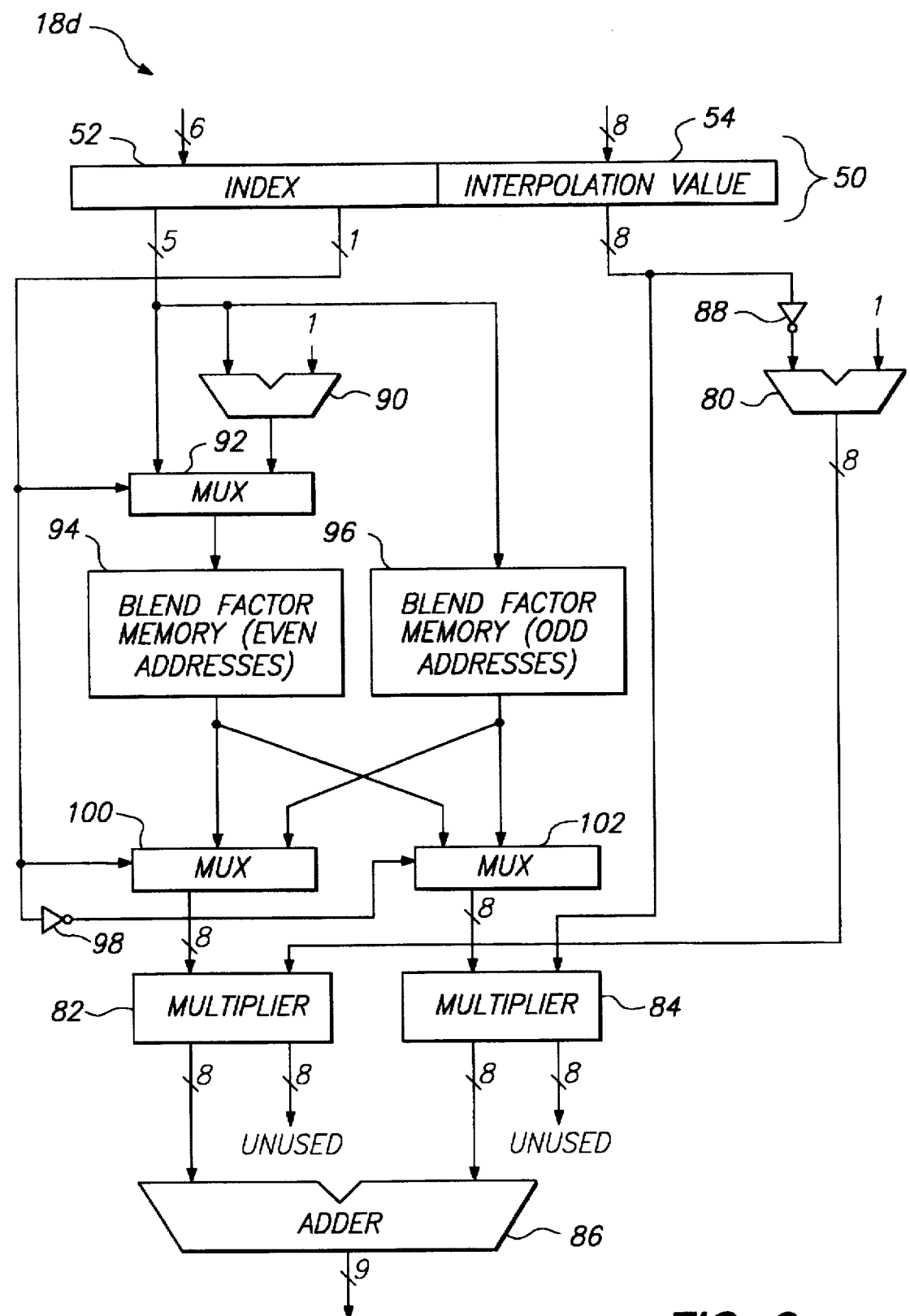
FIG. 8 is block diagram of a fourth embodiment for the blend value generation unit constructed according to the present invention.

Referring now to FIGS. 6–8, alternate embodiments of the blend value generation unit 18 will be described. For consistency and ease of understanding like part numbers have been used to reference like parts in the alternate embodiments of the blend value generation unit 18.

Referring now to FIG. 6, a second embodiment of the blend value generation unit 18b is shown. The second embodiment of the blend value generation unit 18b differs from the first embodiment because the δ value is calculated dynamically and need not be stored in memory, and a single dual port memory is used in place of the two memories 56, 58 required with the first embodiment. The second embodiment of the blend value generation unit 18b comprises: the register 50 having upper and lower portions 52, 54; the multiplier 60; the adder 62; a second adder 70, a dual port blend factor memory 72; and a subtraction unit 74. In the second embodiment, the index is used to locate a table entry, and the interpolation value is used with a dynamically calculated δ value to interpolate between table entries. The δ value is dynamically calculated by reading the current table entry from memory 72 and next table entry from memory 72, and subtracting the value of the current table entry from the next table entry.

As shown in FIG. 6, the register 50 receives and stores the index and interpolation value. The index is output by the upper portion 52 of the register which is coupled to first address inputs of the memory 72 and first inputs of the second adder 70. The second inputs to the second adder 70 are preferably hard-wired to "1" such that one is added to the index to produce the index for the next entry in the table. The output of the second adder 70 is preferably coupled to the second address input of the memory 72. As has been noted above, the memory 72 is preferably a dual port memory capable of accepting two addresses simultaneously and providing the data at the applied addresses simultaneously. The first data output of the memory 72 is coupled to the first inputs of the adder 62 and provides a base value to which the incremental value is added. The first data output of the memory 72 is also coupled to the second inputs of the subtraction unit 74 for dynamic calculation of the δ value. The first inputs of the subtraction unit 74 are coupled to the second data output of the memory 72. The subtraction unit 74 subtracts the value applied at its second inputs, B, from the value applied on its first inputs, A, and may be formed from an ALU, combinational logic or various other forms recognizable to those skilled in the art. The output of the subtraction unit 74 is coupled to the first inputs of the multiplier 60 and multiplied with the interpolation value as has been described above with reference to the first embodiment. Again, only the eight most significant bits are coupled to the adder for summing with the base value to ultimately generate the blend value.

Referring now to FIG. 7, a third embodiment of the blend value generation unit 18c is shown. The third embodiment of the blend value generation unit 18c differs from the first and second embodiments because a δ value is not used. The third embodiment of the blend value generation unit 18c comprises: the register 50 having upper and lower portions 52, 54; the second adder 70, a dual port blend factor memory 72; a third adder 80, a fourth adder 86 and a pair of multipliers 82, 84. In the third embodiment, the blend value is calculated by summing the product of the current table entry and one minus the interpolation value with the product of the next table entry and the interpolation value [blend value= table entry*(1−interpolation value)+next table entry*interpolation value].

Like the second embodiment, the third embodiment 18c has the upper portion 52 of the register 50 coupled to the second adder 70 and the memory 72 such that the memory 72 outputs the current table entry and the next table entry. The first data output of the memory 72 is coupled to a first input of multiplier 82 and the second data output of the memory 72 is coupled to a first input of multiplier 84 to provide the current and next table entry values, respectively. The lower portion 54 of the register 50 is coupled to the second input of multiplier 84. The lower portion 54 of the register 50 is coupled through inverter 88 to the first inputs of adder 80. The second input of adder 80 is preferably hard-wired to 1 such that the interpolation value is effectively subtracted from one. The output of the adder 80 is coupled to the second input of multiplier 82. The pair of multipliers 82, 84 are preferably the same as multiplier 60. The outputs of the multipliers 82, 84 are respectively coupled to the first and second inputs of the adder 86. The outputs of the multipliers 82, 84 that are provided as inputs to the adder 86 are the eight most significant bits from each multiplier 82, 84. The adder 86 provides the blend value at its output.

Referring now to FIG. 8, a fourth and final embodiment of the blend value generation unit 18d is shown. The fourth embodiment of the blend value generation unit 18d differs from the other embodiments because there is a memory 94 for even addresses and a separate memory 96 for odd addresses. The fourth embodiment 18d most closely parallels the third embodiment except the dual port memory 72 and adder 70 have been replaced by two blend factor memories 94, 96, an adder 90, and control and routing logic 92, 98, 100 and 102. As in the third embodiment, the blend value is calculated by summing the product of the current table entry and one minus the interpolation value with the product of the next table entry and the interpolation value [blend value=table entry*(1−interpolation value)+next table entry*interpolation value].

The lower portion 54 of the register 50, the inverter 88, the adder 80, the pair of multipliers 82, 84 and adder 86 are coupled identically to the third embodiment as had been described above. The five most significant bits of the index are coupled to a first input of a multiplexer 92, the first inputs of the adder 90, and to the address inputs of the second blend factor memory 96 that holds the odd numbered index values.

In the cases where the index is an odd number, the next entry is in the even indexed address but has an index number one greater than the current index provided by the five most significant bits of upper portion 52, and therefore, the index value must be incremented and then applied to the first memory 94. This accomplished by adder 90 and multiplexer 92. However, where the index is an even number, the five most significant bits of upper portion 52 can be directly applied to both the even and odd address memories 94, 96 for yielding the current entry and the next entry, respectively. The second set of inputs to the adder 90 are preferably hard-wired to a value of one, and the outputs of the adder 90 are coupled to the second set of inputs of multiplexer 92. The output of the multiplexer 92 is coupled to the address inputs of the first blend factor memory 94 for selectively applying either the index or and index incremented by one.

The outputs of the first blend factor memory 94 and the second blend factor memory 96 are coupled to the first and second inputs of a pair of multiplexers 100 and 102 effectively forming a cross-bar switch that allows the output of either memory 94, 96 to be applied to either multiplier 82, 84. The outputs of multiplexer 100 are coupled to a first set of inputs for multiplier 82 and the outputs of multiplexer 102 are coupled to a first set of inputs for multiplier 84. The least significant bit of the index from the upper portion 52 is coupled to the multiplexers 92, 100 and through an inverter 98 to multiplexer 102 to control the selection of data that the multiplexers 92, 102, 104 pass. For example, if the index is even then the 5 MSB of the index are used to address both memories 94, 96 and the LSB of the index is zero because the index is even, thus routing data from the first memory 94 through multiplexer 100 to multiplier 82 and the data from the second memory 96 through multiplexer 102 to multiplier 84. In contrast, when the index is odd, then the 5 MSB of the index are used to address memory 96 while an increment value of the 5 MSB of the index is created by adder 90 and passes through multiplexer 92 to be applied to the address inputs of memory 94. Since the LSB of the index is also one because the index is odd, the data from the first memory 94 is routed through multiplexer 102 to multiplier 84 and the data from the second memory 96 through multiplexer 100 to multiplier 82.

Figure 9:
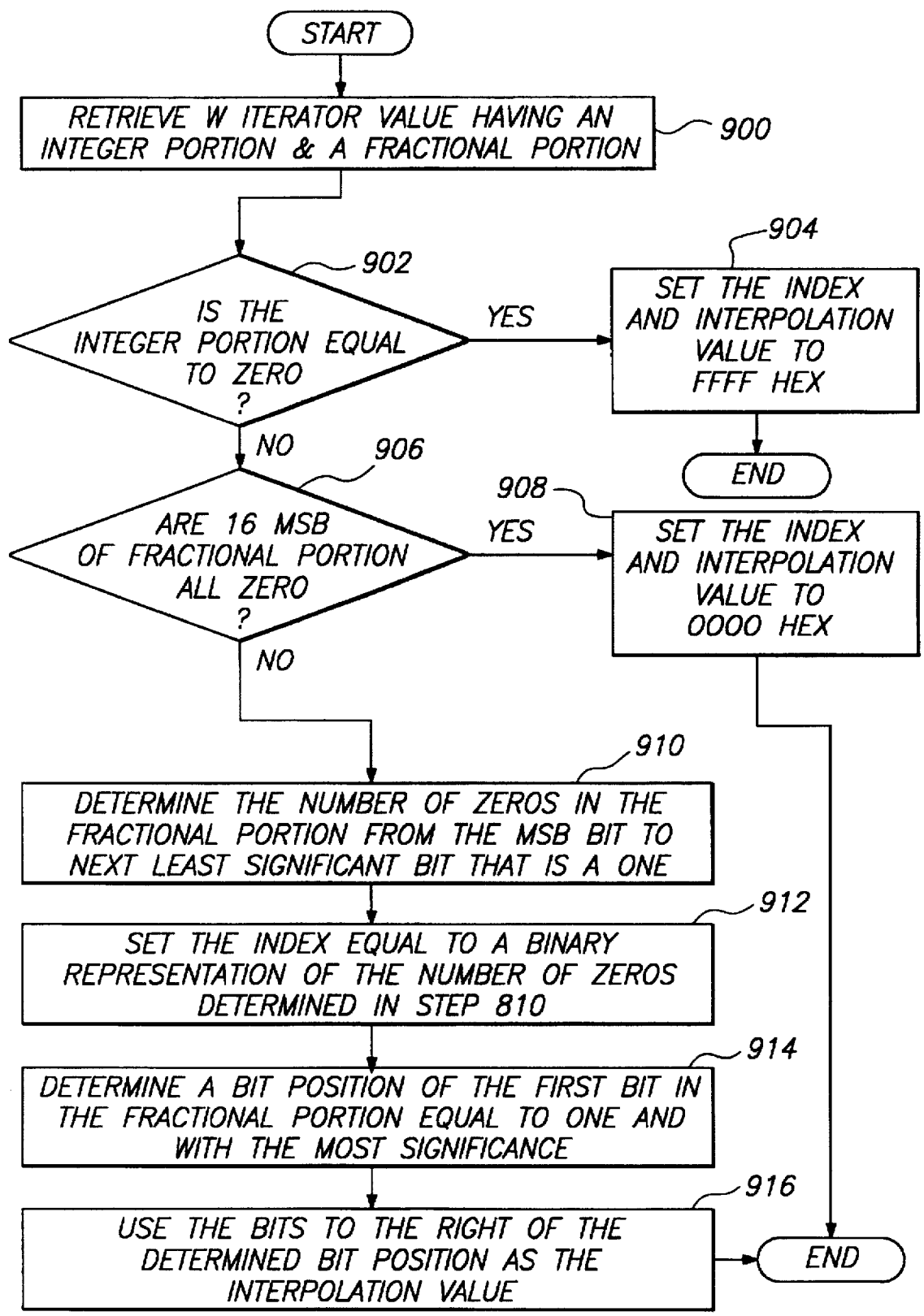
FIG. 9 is a flowchart of a preferred method for generating a blend index according to the present invention.

Referring now to FIG. 9, a flow chart of a method for creating an index is shown. The method begins in step 900 by eider receiving or retrieving an iterator value having an integer portion and a fractional portion. Then in step 902, the method tests whether the integer portion of the iterator value is equal to zero. If the integer portion of the iterator value is equal to zero, the method proceeds to step 904 where the index value and the interpolation value are set to all ones because an out-of-range condition has been detected, and then the method ends. On the other hand, if the integer portion of the iterator value is not equal to zero, the method continues in step 906. In step 906, the method tests whether the sixteen most significant bits of the fractional portion are all zero. If the sixteen most significant bits of the fractional portion are all zero, the method proceeds to step 908 because another an out-of-range condition has been detected. In step 908, the method sets the index value and the interpolation value to all zeros, after which the method ends. Otherwise, if the sixteen most significant bits of the fractional portion are not all zero, the method moves to step 910 and determines the number of zeros in the fractional portion from the most significant bit to the next less significant bit that is a one. Then in step 912, the method sets the index value equal to the number of zeros before the leading and most significant one of the fractional value as determined in step 910.

Next in step 914, the method determines the bit position of the first bit that is equal to one and is of the most significance (i.e., the bit position of the leading one). Then in step 916, the method uses a fixed number of bits to the right of the bit position determined in step 914 as the interpolation value, and the method is complete.

Figure 10:
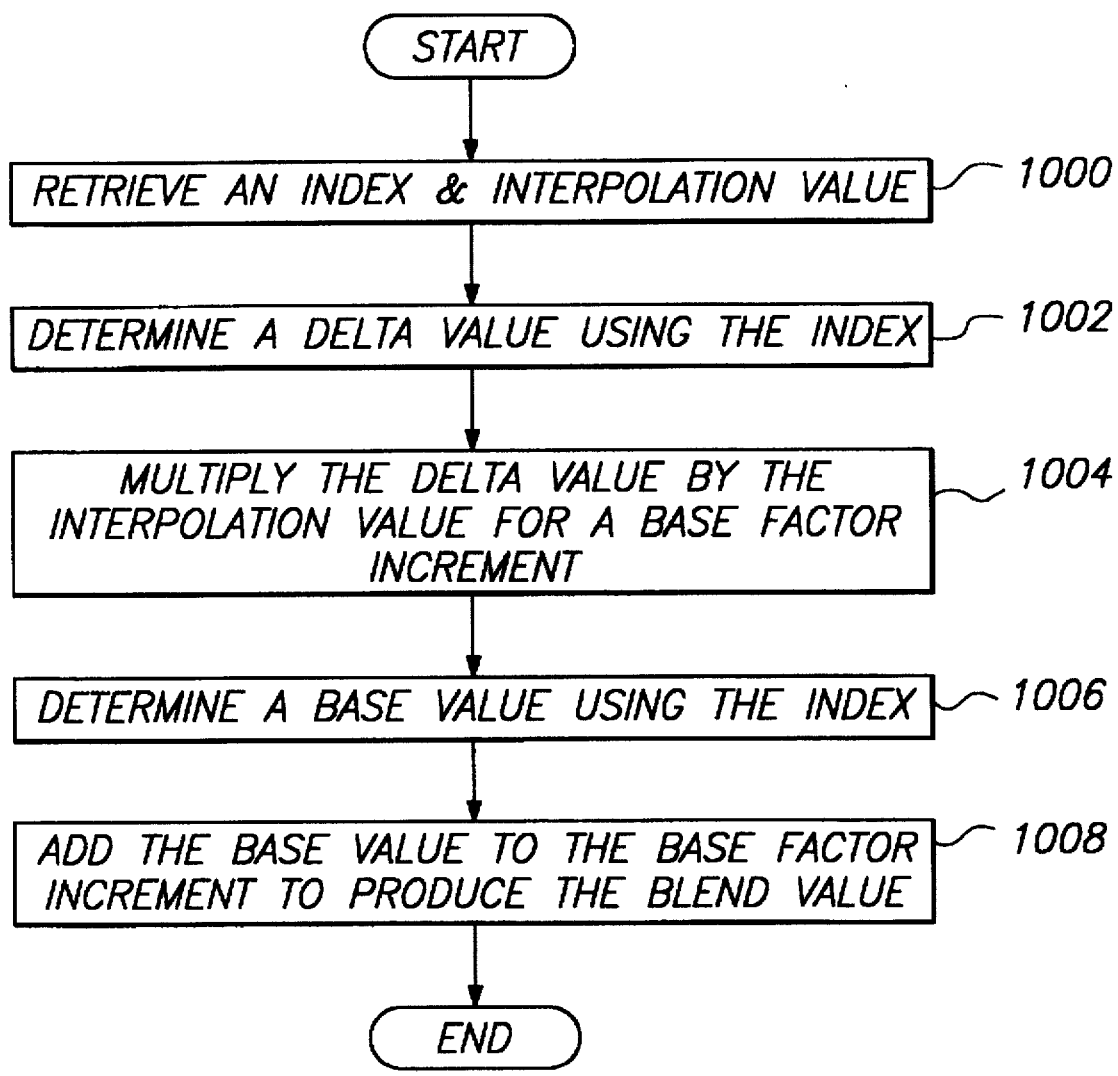
FIG. 10 is a flowchart of a preferred method for generating a blend value using a blend index according to the present invention.

The present invention also includes a method for generating a blend value as detailed below with reference to the flowchart of FIG. 10. The method for generating a blend value starts in step 1000 by receiving an index and an interpolation value. Then in step 1002, the method determines a delta ($\delta$) value using the index. The method can determine the delta value by using the index to access a table of various delta values. Alternatively, the $\delta$ value can be determined using the index, by retrieving a first value for a current entry specified by the index and the retrieving a second value for a next entry specified by the index incremented by one, and determining the difference between the first value and the second value. Next, the method continues in step 1004 by multiplying the interpolation value retrieved in step 1000 by the $\delta$ value to produce a base factor increment. Then in step 1006, the base value is determined using the index. This is preferably done by reading the base value from a look-up table where the index identifies the entry in the look-up table. Finally, the base factor increment is added to the base value to produce the blend value in step 1008.

While the present invention has been described with reference to certain preferred embodiments, those skilled in the art will recognize that various modifications may be provided. These and other variations upon and modifications to the preferred embodiments are provided for by the present invention, which is limited only by the following claims.

---

Appendix A

A sample fog table for haze is shown below. The z values can be considered to be the distance in feet from the viewer. The fog values are floating point blend factors in the range [0,1], the next column is the base value which is just the floating point value multiplied by 255. The actual hardware takes numbers from [0,255], so we would round the fractional value to the nearest integer. Note that since the index is 4.2 (exponent, mantissa) that the distance from the viewer doubles every four table entries. Thus, we have four table entries for every power of 2, which is what gives us the ability to represent very thick fog as well as thin haze. The final column is the delta value which is the difference between the current base value and the next base value as used in the preferred embodiment (FIG. 5) of the present invention. Although not shown as such the delta value is preferably rounded to the nearest integer.

| Index | Distance (z) | Blend Factor (Fog values) | Base Value | Delta |
|---|---|---|---|---|
| i = 0 | z = 1.0 | 0.00 | 0.0 | 0.04 |
| i = 1 | z = 1.2 | 0.00 | 0.0 | 0.01 |
| i = 2 | z = 1.4 | 0.00 | 0.1 | 0.01 |
| i = 3 | z = 1.7 | 0.00 | 0.1 | 0.01 |
| i = 4 | z = 2.0 | 0.00 | 0.1 | 0.01 |
| i = 5 | z = 2.4 | 0.00 | 0.1 | 0.02 |
| i = 6 | z = 2.8 | 0.00 | 0.1 | 0.02 |
| i = 7 | z = 3.4 | 0.00 | 0.1 | 0.02 |
| i = 8 | z = 4.0 | 0.00 | 0.2 | 0.03 |
| i = 9 | z = 4.8 | 0.00 | 0.2 | 0.03 |
| i = 10 | z = 5.7 | 0.00 | 0.2 | 0.04 |
| i = 11 | z = 6.7 | 0.00 | 0.3 | 0.04 |
| i = 12 | z = 8.0 | 0.00 | 0.3 | 0.05 |
| i = 13 | z = 9.5 | 0.00 | 0.4 | 0.06 |
| i = 14 | z = 11.3 | 0.00 | 0.5 | 0.07 |
| i = 15 | z = 13.5 | 0.00 | 0.5 | 0.09 |
| i = 16 | z = 16.0 | 0.00 | 0.6 | 0.10 |
| i = 17 | z = 19.0 | 0.00 | 0.8 | 0.12 |
| i = 18 | z = 22.6 | 0.00 | 0.9 | 0.15 |

-continued

Appendix A

| | | | | |
|---|---|---|---|---|
| i = 19 | z = 26.9 | 0.00 | 1.1 | 0.17 |
| i = 20 | z = 32.0 | 0.01 | 1.3 | 0.21 |
| i = 21 | z = 38.1 | 0.01 | 1.5 | 0.24 |
| i = 22 | z = 45.3 | 0.01 | 1.8 | 0.29 |
| i = 23 | z = 53.8 | 0.01 | 2.2 | 0.34 |
| i = 24 | z = 64.0 | 0.01 | 2.6 | 0.41 |
| i = 25 | z = 76.1 | 0.01 | 3.1 | 0.48 |
| i = 26 | z = 90.5 | 0.01 | 3.6 | 0.58 |
| i = 27 | z = 107.6 | 0.02 | 4.3 | 0.68 |
| i = 28 | z = 128.0 | 0.02 | 5.1 | 0.81 |
| i = 29 | z = 152.2 | 0.02 | 6.1 | 0.96 |
| i = 30 | z = 181.0 | 0.03 | 7.2 | 1.14 |
| i = 31 | z = 215.3 | 0.03 | 8.6 | 1.34 |
| i = 32 | z = 256.0 | 0.04 | 10.2 | 1.59 |
| i = 33 | z = 304.4 | 0.05 | 12.0 | 1.88 |
| i = 34 | z = 362.0 | 0.06 | 14.2 | 2.21 |
| i = 35 | z = 430.5 | 0.07 | 16.8 | 2.60 |
| i = 36 | z = 512.0 | 0.08 | 19.9 | 3.06 |
| i = 37 | z = 608.9 | 0.09 | 23.5 | 3.59 |
| i = 38 | z = 724.1 | 0.11 | 27.7 | 4.19 |
| i = 39 | z = 861.1 | 0.13 | 32.6 | 4.89 |
| i = 40 | z = 1024.0 | 0.15 | 38.3 | 5.68 |
| i = 41 | z = 1217.7 | 0.18 | 44.8 | 6.56 |
| i = 42 | z = 1448.2 | 0.21 | 52.4 | 7.55 |
| i = 43 | z = 1722.2 | 0.24 | 61.0 | 8.62 |
| i = 44 | z = 2048.0 | 0.28 | 70.8 | 9.78 |
| i = 45 | z = 2435.5 | 0.32 | 81.8 | 10.99 |
| i = 46 | z = 2896.3 | 0.37 | 94.0 | 12.22 |
| i = 47 | z = 3444.3 | 0.42 | 107.4 | 13.41 |
| i = 48 | z = 4096.0 | 0.48 | 121.9 | 14.51 |
| i = 49 | z = 4871.0 | 0.54 | 137.3 | 15.41 |
| i = 50 | z = 5792.6 | 0.60 | 153.3 | 16.02 |
| i = 51 | z = 6888.6 | 0.66 | 169.6 | 16.24 |
| i = 52 | z = 8192.0 | 0.73 | 185.5 | 15.97 |
| i = 53 | z = 9742.0 | 0.79 | 200.7 | 15.16 |
| i = 54 | z = 11585.2 | 0.84 | 214.5 | 13.78 |
| i = 55 | z = 13777.2 | 0.89 | 226.4 | 11.92 |
| i = 56 | z = 16384.0 | 0.93 | 236.1 | 9.71 |
| i = 57 | z = 19484.0 | 0.95 | 243.5 | 7.36 |
| i = 58 | z = 23170.5 | 0.97 | 248.6 | 5.13 |
| i = 59 | z = 27554.5 | 0.99 | 251.8 | 3.23 |
| i = 60 | z = 32768.0 | 0.99 | 253.6 | 1.81 |
| i = 61 | z = 38967.9 | 1.00 | 254.5 | 0.88 |
| i = 62 | z = 46341.0 | 1.00 | 254.9 | 0.36 |
| i = 63 | z = 55109.0 | 1.00 | 255.0 | 0.12 |

What is claimed is:

1. A method for determining a fog value for a pixel in a computer system having a memory, the fog value based upon an exponential fog function, the method comprising the steps of:

receiving a first value representing an inverse of a depth component of the pixel, said first value having a first portion and a second portion;

generating a floating point signal of said second portion having the steps of:

identifying a second value equal to the number of binary zeros preceding the first binary one in the second portion;

repeatedly shifting a most significant bit of said second portion a first number of times to generate a shifted value, said first number of times one greater than said second value;

performing a complement operation on said shifted value to generate a complement value;

concatenating said second value and a portion of said complement value to generate said floating point signal;

setting said floating point signal to zero if all bits in said first portion are not equal to a third value; and setting said floating point signal equal to a value comprised of all binary ones if a first number of most significant bits in said second portion are all equal to a fourth value; and determining the fog value using said floating point signal.

2. The method of claim 1, further comprising the steps of:

generating an index value equal to N most significant bits of said floating point signal;

generating an interpolation value equal to M next most significant bits of the floating point signal.

3. The method of claim 2, wherein said step of determining the fog value includes the steps of:

identifying a first table entry corresponding to said index value, said table entry part of a table data stored in the memory;

identifying a delta value representing the difference between said first table entry and a subsequent table entry;

multiplying said delta value and said interpolation value to determine a fifth value; and adding said first table entry and said fifth value to generate the fog value, said fog value representing an estimate of the value of the exponential fog function for said depth component.

4. The method of claim 3, further comprising the step of:

blending a color pixel data and a fog color data associated with a pixel in a proportion based upon the fog value to generate a blended color output for said pixel.

5. A system for generating a fog value from a depth component, said fog value representing an estimate of an exponential fog function, the system comprising:

an floating point generation unit having:

a first register for storing an inverse of said depth component having a first, second, and third portion;

a first one encoder, disposed to receive signals representing the second portion of said first register, to determine an index that is equal number of bits having a value of a binary zero preceding the first bit having a value of binary one;

a shift register, disposed to receive signals representing the second and third portion of said first register, to perform a shift operation on the bits in the second and third portion of said register until said first bit having a value of binary one is shifted out of the register, to generate a shifted value;

a complement unit, disposed to receive signals from said shift register, for performing a binary complement operation on a portion of bits in said shifted value to generate a complement value;

a concatenation register for concatenating said index and said complement value to generate a floating point signal;

a first clamp, disposed to receive signals from said first register, to set said floating point signal equal to all binary ones if all of the bits in said second portion have a first value;

a second clamp, disposed to receive signals from said first register, to set said point signal equal to all binary zeros if all of the bits in said first portion do not have a first value;

a fog generation unit, disposed to receive said floating point signal, for generating a fog value based upon said floating point signal.

6. The system of claim 5, further comprising:

an table index generation unit, disposed to receive signals from said floating point generation unit, for generating an index value equal to N most significant bits of said floating point signal;

an interpolation unit, disposed to receive signals from said floating point generation unit, for generating an interpolation value equal to M next most significant bits of the floating point signal.

7. The system of claim 6, wherein said fog generation unit includes:

an index generation unit, disposed to receive said floating point signal, to identify a first table entry corresponding to said index value, said table entry part of a table data stored in the memory; and an interpolation unit, disposed to receive said floating point signal, for identifying a delta value representing the difference between said first table entry and a subsequent table entry, for multiplying said delta value and said interpolation value to determine a fifth value, and for adding said first table entry and said fifth value to generate the fog value, said fog value representing an estimate of the value of the exponential fog function for said depth component.

8. The system of claim 7, further including:

a fog blending unit, disposed to receive said fog value, for blending a color pixel data and a fog color data associated with a pixel in a proportion based upon the fog value to generate a blended color output for said pixel.

9. A computer based system for determining a fog value for a pixel, having a memory, the fog value based upon an exponential fog function, the system comprising:

first receiving means for receiving a first signal having a first value representing an inverse of a depth component of the pixel, said first value having a first portion and a second portion;

first generation means, disposed to receive said first signal, for generating a floating point signal of said second portion, said first generation means including:

identifying means, disposed to receive said first signal, for identifying a second value equal to the number of binary zeros preceding the first binary one in the second portion;

shifting means, coupled to said identifying means, for repeatedly shifting a most significant bit of said second portion a first number of times to generate a shifted value, said first number of times one greater than said second value;

complement means, disposed to receive said shifted value, for performing a complement operation on said shifted value to generate a complement value;

concatenating means, disposed to receive said complement value, for concatenating said second value and a portion of said complement value to generate said floating point signal;

first clamp means, coupled to said first signal, for setting said floating point signal to zero if all bits in said first portion are not equal to a third value; and second claim means, coupled to said first signal, for setting said floating point signal equal to a value comprised of all binary ones if a first number of most significant bits in said second portion are all equal to a fourth value; and fog value generation means, disposed to receive said floating point signal, for determining the fog value using said floating point signal.

10. The system of claim 9, further comprising:

index generation means, disposed to receive said floating point signal, for generating an index value equal to N most significant bits of said floating point signal;

interpolation means, disposed to receive said floating point signal, for generating an interpolation value equal to M next most significant bits of the floating point signal.

11. The system of claim 10, wherein said fog value generation means includes:

first identification means, disposed to receive said index value, for identifying a first table entry corresponding to said index value, said table entry part of a table data stored in the memory;

second identification means for identifying a delta value representing the difference between said first table entry and a subsequent table entry;

multiplication means, coupled to said second identification means, for multiplying said delta value and said interpolation value to determine a fifth value; and adding means, coupled to said multiplication means, for adding said first table entry and said fifth value to generate the fog value, said fog value representing an estimate of the value of the exponential fog function for said depth component.

12. The system of claim 11, further comprising:

fog blending means, disposed to receive a signal representing said fog value, for blending a color pixel data and a fog color data associated with a pixel in a proportion based upon the fog value to generate a blended color output for said pixel.

* * * * *